(12) United States Patent
Regan et al.

(10) Patent No.: US 11,929,839 B1
(45) Date of Patent: Mar. 12, 2024

(54) MACHINE-LEARNING-BASED DETERMINATION OF EVENT STABILITY FOR EVENT COORDINATION SYSTEM(S)

(71) Applicant: INTERNATIONAL BUSINESS MACHINES CORPORATION, Armonk, NY (US)

(72) Inventors: James Edward Regan, Brookfield, CT (US); Mauro Marzorati, Lutz, FL (US); Arif Basha, Springfield, VA (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/047,326

(22) Filed: Oct. 18, 2022

(51) Int. Cl.
*H04L 12/18* (2006.01)
*G06F 16/955* (2019.01)
*G06N 20/00* (2019.01)

(52) U.S. Cl.
CPC ........ *H04L 12/1818* (2013.01); *G06F 16/955* (2019.01); *G06N 20/00* (2019.01)

(58) Field of Classification Search
CPC .... H04L 12/1818; G06N 20/00; G06F 16/955
See application file for complete search history.

(56) References Cited

U.S. PATENT DOCUMENTS

| | | | |
|---|---|---|---|
| 8,131,401 B2 * | 3/2012 | Nasle | G05B 23/0235 700/286 |
| 8,185,426 B1 | 5/2012 | Khoubyari | |
| 9,172,738 B1 | 10/2015 | deCosta | |
| 9,306,962 B1 * | 4/2016 | Pinto | H04L 63/1416 |
| 9,620,959 B2 | 4/2017 | Sen et al. | |

(Continued)

FOREIGN PATENT DOCUMENTS

KR 2017-0084100 A 7/2017

OTHER PUBLICATIONS

Anonymous, "Method and System for Hierarchical Calendar Synchronization to Integrate Correlated Calendar and Weather Events", IP.com No. IPCOM000251149D, published Oct. 17, 2017 (4 pages) (Year: 2017).
Chitti et al., "Seamless Smart Event Equalizer", IP.com No. IPCOM000146925D, published Feb. 27, 2007 (5 pages) (Year: 2007).

(Continued)

*Primary Examiner* — Azizul Choudhury
(74) *Attorney, Agent, or Firm* — Michael A. Petrocelli, Esq.; Kevin P. Radigan, Esq.; Heslin Rothenberg Farley & Mesiti P.C.

(57) ABSTRACT

Machine-learning-based determination of event stability is provided to facilitate loose coupling of event coordination systems. The method includes training a machine learning model to determine stability of events of an event coordination system based on a plurality of attributes of the events, and using the machine learning model to determine an event stability for an event of the event coordination system. Further, the method includes comparing the determined event stability for the event to a stability threshold, and determining that the event is a stable event based on the event stability extending the stability threshold. Based on determining that the event is the stable event, the stable event is propagated from the event coordination system to another event coordination system.

19 Claims, 7 Drawing Sheets

(56) References Cited

U.S. PATENT DOCUMENTS

| | | | |
|---|---|---|---|
| 10,673,232 | B2 | 6/2020 | Zhao et al. |
| 10,926,659 | B2 | 2/2021 | Lee et al. |
| 2005/0116814 | A1 | 6/2005 | Rodgers et al. |
| 2009/0132329 | A1 | 5/2009 | Lam et al. |
| 2012/0316691 | A1 | 12/2012 | Boardman et al. |
| 2016/0140508 | A1 | 5/2016 | Ossia et al. |
| 2020/0084280 | A1* | 3/2020 | Malhotra ............... G06N 20/00 |
| 2020/0097844 | A1* | 3/2020 | Kansky ................. G06N 5/042 |
| 2022/0019913 | A1* | 1/2022 | Ayyadevara ............. G06N 5/04 |
| 2022/0027257 | A1* | 1/2022 | Harutyunyan ........... G06N 5/01 |
| 2022/0327422 | A1* | 10/2022 | Skogstad ................ G06N 3/08 |
| 2023/0048378 | A1* | 2/2023 | Yashchin ............... G06N 20/00 |
| 2023/0102786 | A1* | 3/2023 | Garapati ............... G06N 20/20 |
| | | | 706/50 |

OTHER PUBLICATIONS

Huang et al., "An Optimal Integration of Multile Machine Learning Techniques to Real-Time Reservoir Inflow Forecasting", Research Square, DOI: https://doi.org/10.21203/rs.3.rs-599274/v1, posted Jun. 16, 2021 (35 pages) (Year: 2021).

Kumar et al., "Event Conflict Resolution Algorithm", IP.com No. IPCOM000159856D, published Oct. 31, 2007 (6 pages) (Year: 2007).

Marotta et al., "A Conflict-Resilient Lock-Free Calendar Queue for Scalable Share-Everything PDES Platforms", SIGSIM-PADS '17, May 24-26, 2017, DOI: http://dx.doi.org/10.1145/3064911.3064926 (12 pages) (Year: 2017).

Rao et al., "Multi-tier Queues for PDES", ACM Transations on Modeling and Computer Simulation, vol. 20, No. 2, published Mar. 2019 (1 page) (Year: 2019).

* cited by examiner

US 11,929,839 B1

MACHINE-LEARNING-BASED DETERMINATION OF EVENT STABILITY FOR EVENT COORDINATION SYSTEM(S)

BACKGROUND

One or more aspects relate, in general, to event coordination systems, and more particularly, to loosely coupling event coordination systems using machine-learning-based event stability determinations.

With the wide adoption of Internet-based conferencing or event platforms, an event invite is typically sent with a URL that can be used to automatically log an attendee into the specified event. Different people initiating events may configure the associated electronic invitations differently, and as a result, a plethora of a resultant invite configurations are possible in an event coordination system. For instance, certain event organizers may provide a formally composed URL in an appropriate location, such as in a field of the electronic invitation, that an event system is able to process, while other event organizers may require pasting of an HTML-composed URL into a description field, which the event coordination systems will then know how to handle. There are also invitations from event organizers that will require pasting a textual representation of a URL into a web browser in order for the attendee to attend the event.

SUMMARY

Certain shortcomings of the prior art are overcome, and additional advantages are provided through the provision, in one or more aspects, of a computer-implemented method of loosely coupling event coordination systems. The computer-implemented method includes training a machine learning model to determine stability of events of an event coordination system using a plurality of attributes of the events, and using the machine learning model to determine an event stability for an event of the event coordination system. The computer-implemented method further includes comparing the determined event stability for the event to a stability threshold, and determining that the event is a stable event based on the event stability exceeding the stability threshold. In addition, the computer-implemented method includes propagating the stable event from the event coordination system to another event coordination system based on determining that the event is the stable event.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
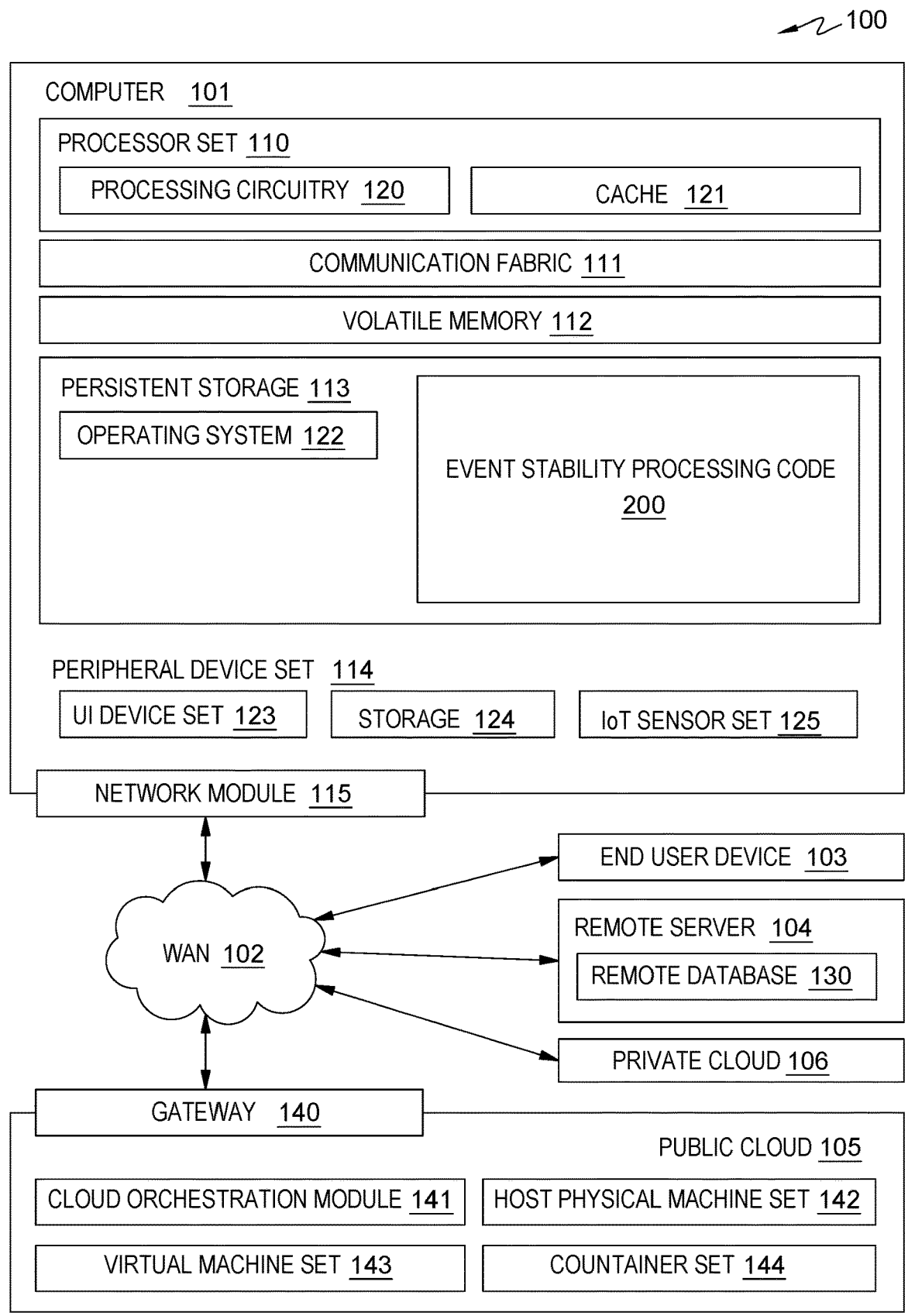
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and event stability processing code 200, which are stored in persistent storage 113.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as event stability processing code block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As noted, in one example, with the wide adoption of Internet-based event conferencing platforms, an event invite is typically sent to an invitee's event coordination system with a URL that can be used to automatically log an attendee into the specified event. Different people initiating events may configure the electronic invitations differently, and as a result, a plethora of resultant invite configurations are possible in the event coordination system. For instance, certain event organizers may provide a formally-composed URL in an appropriate location that the event coordination system is able to process, while other event organizers may require pasting of an HTML-composed URL into a description field, which the event coordination system may know how to handle. There are also event organizers that require pasting a textual representation of a URL into a web browser in order for the attendee to attend the online event.

One way to address this variability is to use a separate reminder event coordination system to initiate a reminder message with an appropriately-crafted URL at the event start time. While useful, the practice introduces the issue of synchronously maintaining two autonomous event coordination systems.

Advantageously, disclosed herein are computer program products, computer systems, and computer-implemented methods for loosely coupling event coordination systems. The method includes training a machine learning model to determine stability of events of an event coordination system using a plurality of attributes of the events, and using the machine learning model to determine an event stability for an event of the event coordination system. Further, the method includes comparing the determined event stability for the event to a specified stability threshold, and determining that the event is a stable event based on the event stability exceeding the stability threshold. In addition, the method includes propagating the stable event from the event coordination system to another event coordination system based on determining that the event is the stable event. In this manner, stable events are automatically propagated from the event coordination system to the other event coordination system, thereby loosely coupling events in the event coordination systems. In one or more implementations, where event stability is below the stability threshold, the event is not propagated from the event coordination system to the other event coordination system. In this manner, selective synchronization of events between event coordination systems is achieved based on information about the events themselves, such as stability of the events, determined by related attributes of the events.

In one or more embodiments, propagating the stable event further includes providing a clickable URL link for the event with propagating of the event from the event coordination system to the other event coordination system. Further, in one or more implementations, the method also includes initiating one or more derivative actions, based on determining that the event is the stable event, in addition to propagating the stable event from the event coordination system to the other event coordination system. For instance, the one or more derivative actions can include one or more actions related to the event, such as obtaining a refundable or non-refundable reservation for the event, or performing another action(s) related to attending the event, such as arranging one or more other proposed activities or events in the event coordination system or other event coordination system to clear time to attend the event.

In one or more embodiments, using the machine learning model to determine event stability for the event includes using the machine learning model to determine a likelihood that the event will occur as indicated in the event coordination system. In one or more implementations, using the machine learning model to determine the event stability includes comparing the event to historically stable events.

In one or more further embodiments, using the machine learning model to determine event stability includes using related attributes of the event of the plurality of attributes in determining the event stability. In one implementation, the related attributes include, at least in part, event type, frequency of the event, number of invitees to the event, and historical reliability of the event.

In one or more embodiments, using the machine learning model to determine the event stability includes extracting a stability score for each attribute of the related attributes of the event and mapping the stability scores to a radar chart of the related attributes. Further, in one or more implementations, comparing the determined event stability to the stability threshold includes comparing the stability score for each attribute of the related attributes of the event to a corresponding stability threshold for that attribute, and determining that the event is the stable event based on the stability score of a related attribute of the event exceeding the corresponding stability score for that event.

Figure 2:
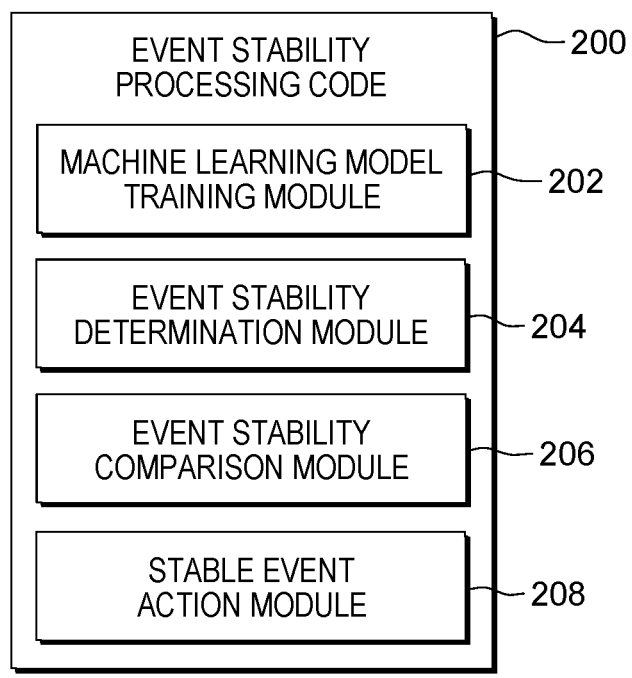
FIG. 2 depicts one embodiment of a computer program product with event stability processing code, in accordance with one or more aspects of the present invention.

By way of example, FIG. 2 depicts one embodiment of a computer program product with event stability processing, in accordance with one or more aspects of the present invention. As illustrated, in one or more embodiments, the computer program product includes event stability processing code 200 of FIG. 1, which includes (in one example) multiple modules, including a machine learning model training module 202, an event stability determination module 204, an event stability comparison module 206, and a stable event action module 208. In one or more embodiments, machine learning model training module 202 includes program code to facilitate training a machine learning model to determine stability of events of an event coordination system using a plurality of attributes of the event, such as described herein. Event stability determination module 204 includes, in one or more embodiments, program code to use the machine learning model to determine an event stability for an event of the event coordination system. In one or more implementations, event stability comparison module 206 includes program code to compare the determined event stability for the event to a stability threshold, and to determine that the event is the stable event based on the event stability exceeding the stability threshold. The stable event action module 208 includes, in one embodiment, program code to propagate the stable event from the event coordination system to another event coordination system based on determining that the event is the stable event.

Figure 3:
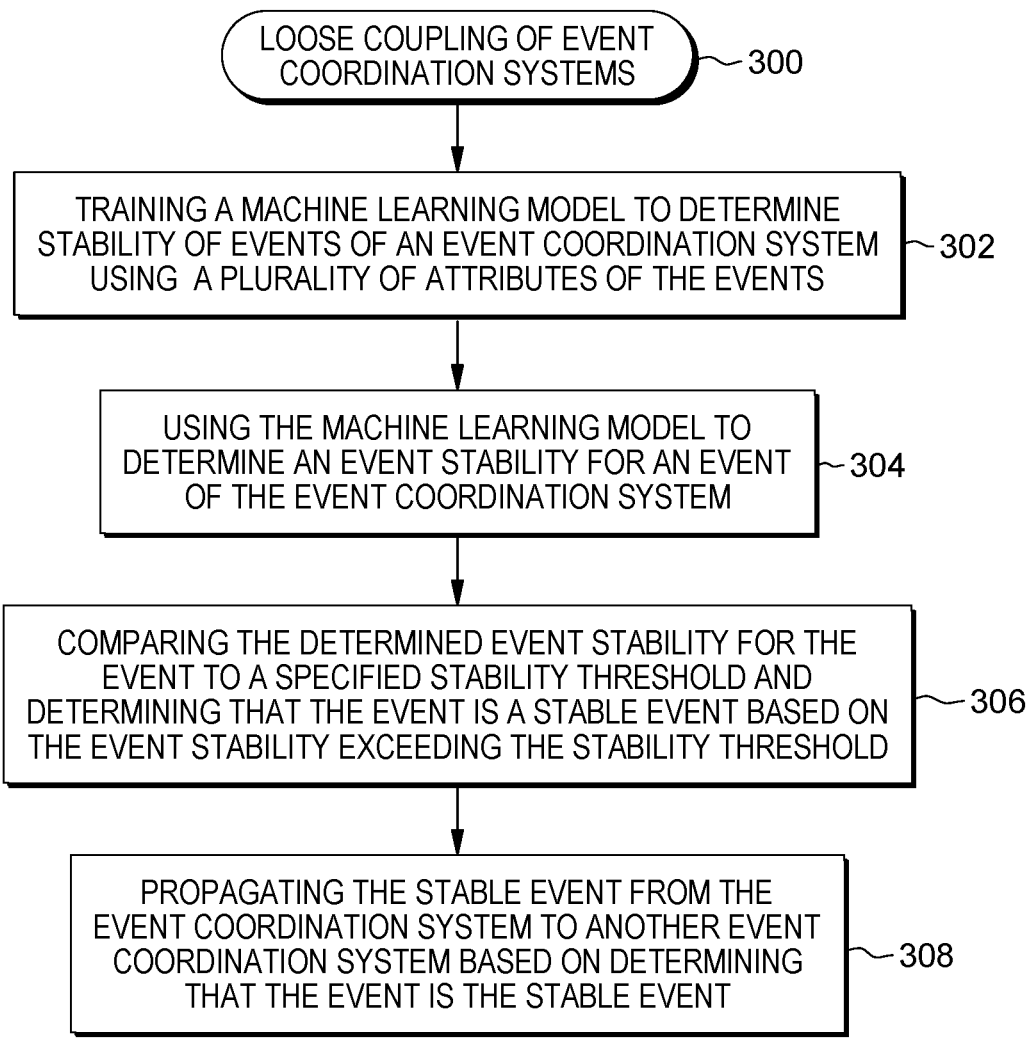
FIG. 3 depicts one embodiment of an event stability processing workflow, in accordance with one or more aspects of the present invention.

FIG. 3 depicts one embodiment of an edge stability processing workflow, in accordance with one or more aspects of the present invention. As illustrated, in one or more implementations, the loosely coupling of event coordination systems 300 includes training a machine learning model to determine stability of events of an event coordination system using a plurality of attributes of the events 302, and using the machine learning model to determine an event stability for an event of the event coordination system 304. Further, the process includes comparing the determined event stability for the event to a specified stability threshold, and determining that the event is a stable event based on the event stability exceeding the stability threshold 306. In addition, the process includes propagating the sable event from the event coordination system and another event coordination system based on determining that the event is the stable event 308. In this manner, a lightweight, partial synchronization mechanism or system is provided for two or more (otherwise autonomous) event coordination systems, and which can synchronize one or more events that are determined or predicted to be stable at the onset. The characterization of stability of an event of an event coordination system is determined, in one or more implementations, from a likelihood that the event will proceed as planned, such as without changes from a current state.

In one or more embodiments, an event can be characterized along a stability scale, from likely to change to unlikely to change. For instance, in one or more embodiments, multivariate related attributes of an event are considered in determining whether to characterize the event as stable, or unlikely to change. In one or more implementations, the determined event stability for the event is compared to a stability threshold, which with multivariate data, can involve comparing a stability score for each attribute of the multivariate attributes to a respective stability threshold. In one implementation, a radar chart-type analysis of related attributes is used in determining whether an event is stable. Based on identify that an event is stable, an action is initiated between the event coordination system containing the event and another event coordination system. The action can be, for instance, a propagation of the event from the event coordination system to the other event coordination system, and/or there can be a two-way synchronization of events between the systems based on identifying that there are multiple stable events in the two systems. Further, in one or more embodiments, the initiated action can include one or more derivative actions based on the event's stability, such as refunding or not refunding an event reservation, and/or arranging subsequent proposed events or activities in the coordination system(s) based on the event's stability.

Figure 4:
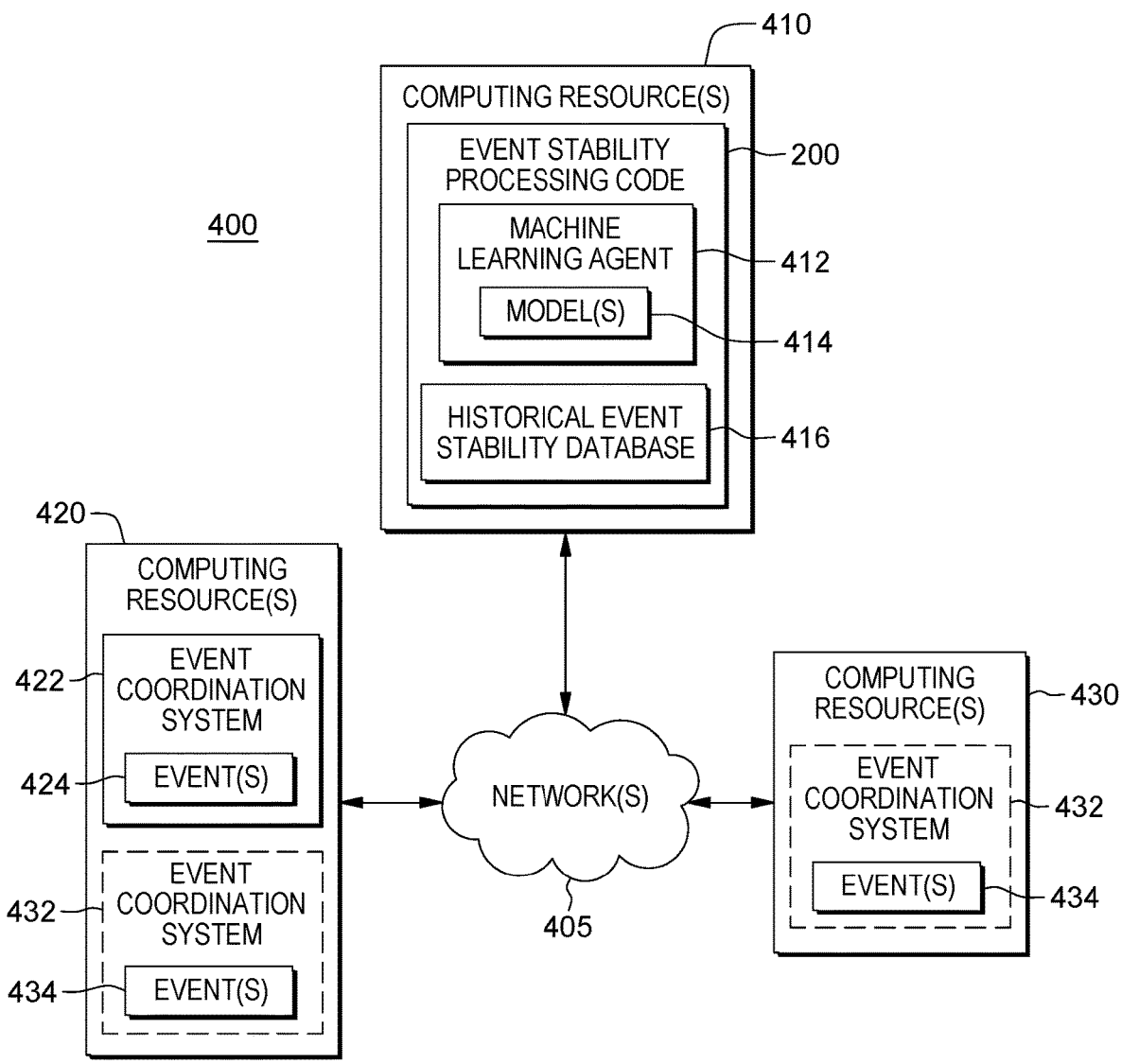
FIG. 4 depicts another example of a computing environment to incorporate and/or use one or more one or more aspects of the present invention.

FIG. 4 depicts another embodiment of a technical environment or system 400, into which various aspects of some embodiments of the present invention can be implemented. In one or more implementations, system 400 is similar to computing environment 100 described above in connection with FIG. 1 with, for instance, one or more of computing resources 410, 420 & 430 being implemented on, or representing instances of, computer 101, remote server 104, end user device 103, public cloud 105 and/or private cloud 106. By way of example, multiple computing resources 410, 420 & 430 of system 400 execute program code which implement one or more aspects of the present invention. In the example illustrated, computing resource(s) 410 includes event stability processing code 200, with one or more associated machine learning agents 412 and one or more models 414 to implement event stability processing and loose coupling of event coordination systems, such as described herein. Further, in one embodiment, computing resource(s) 410 includes an historical event stability database 416 containing, for instance, historical event data (e.g., event attributes, attribute stability thresholds, etc.), for use in determining whether an event in an event coordination system is likely to be stable. In one or more implementations, computing resource(s) 410 can be a cloud-based computing resource accessible across one or more networks 405 by computing resources 420, 430.

By way of example, network(s) 405 can be, or include, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of transmitting and receiving data, including event-related data such as described herein. In one or more implementations, network(s) 405 can utilize any communication protocol that allows data to be transferred between components of system 400 (e.g., one or more wireless interconnection standards, Wi-Fi, cellular (e.g., 3G, 4G, 5G), Ethernet, etc.).

Briefly described, in one or more embodiments, computing resource(s) 410, 420 & 430 can each include one or more processors, for instance, central processing units (CPUs). Also, the respective processor(s) can include functional components used in the integration of program code, such as functional components to fetch program code from locations such as cache or main memory, decode program code, execute program code, access memory for instructions, and write results of the executed instructions or code. The processor(s) can also include a register(s) to be used by one or more of the functional components. In one or more embodiments, the computing resource(s) can include memory, input/output, a network interface, and storage, which can include and/or access one or more other computing resources and/or databases, as required to implement the inventive aspects described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or a local bus, using any of a variety of architectures. By way of example, and not limitation, such architectures can include the Industry Standard Architecture (ISA), the Micro-Channel Architecture (MCA), the enhanced ISA (EISA), the Video Electronic Standard Association (VESA), local bus, and Peripheral Component Interconnect (PCI). As noted, an example of a computer or computing environment which can implement one or more aspects is described above with reference to FIG. 1. Note also that, depending on the implementation, one or more aspects of each computing resource can be associated with, licensed by, subscribed to by, etc., a company or organization, such as a company or organization manufacturing, providing, operating, etc., the event coordination system(s).

As illustrated in FIG. 4, computing resource(s) 420 includes an event coordination system 422, such as an electronic calendar system, which records events 424, such as meetings, presentations, courses, appointments, etc., for a user of the event coordination system. As noted, the user may also use another event coordination system 432 executing on one or more other computing resources 430 (in one example), which may record one or more events 434, which can overlap and/or be different from events 424 of event coordination system 422. Note that, in another embodiment, other event coordination system 432 could optionally reside on the same computing resource(s) 420 as event coordination system 422, as illustrated.

In one or more embodiments, event stability processing code 200, such as described herein, uses, at least in part, artificial intelligence (AI), or a machine learning agent 412, and one or more machine learning models 414. For instance, in one or more implementations, a machine learning model is trained and used to determine an event stability for an event of an event coordination system, for instance, to facilitate propagation of stable events from one event coordination system to another event coordination system. In one or more embodiments, the machine learning model is trained to consider an event with a plurality of multivariate attributes.

Figure 5:
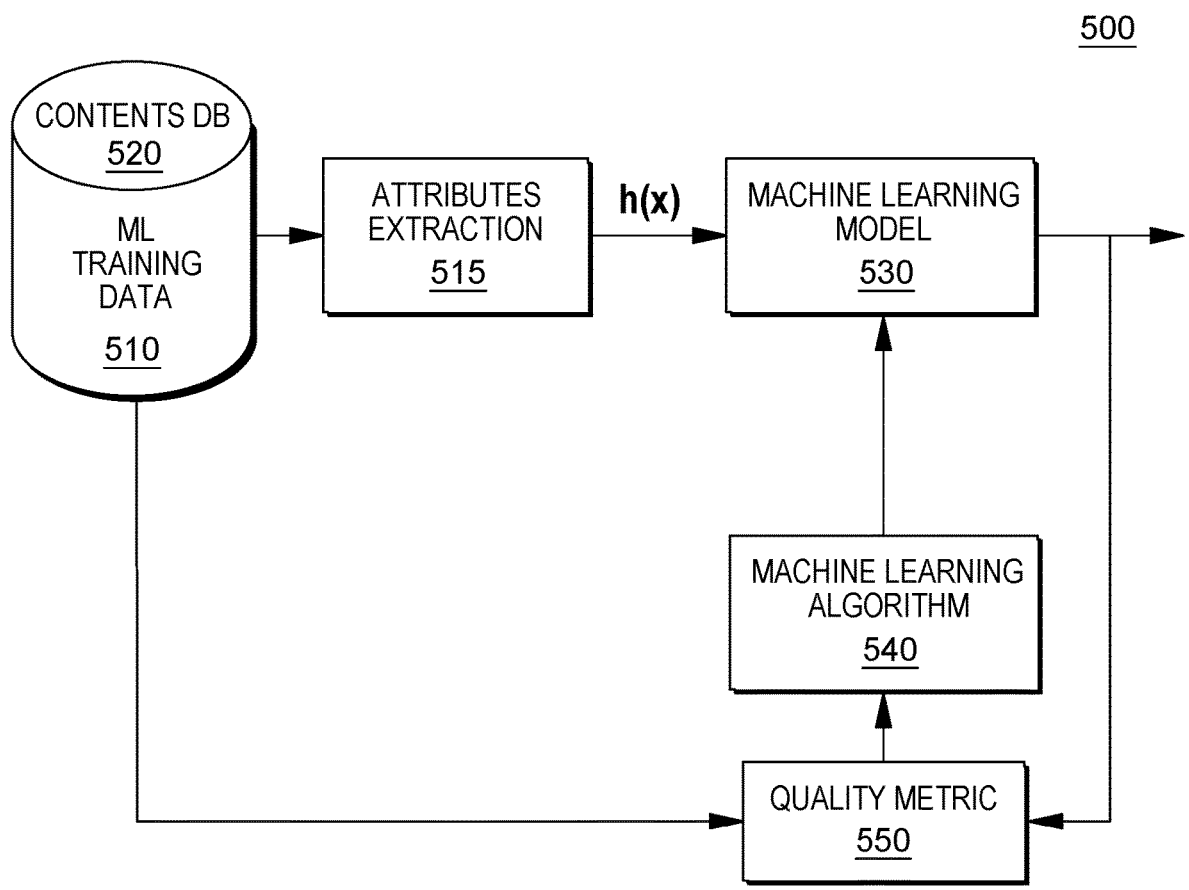
FIG. 5 depicts one example of a machine learning training system used in accordance with one or more aspects of the present invention.

FIG. 5 is one example of a machine learning training process and system 500 that may be utilized, in one or more aspects, to perform cognitive analyses of various attributes, including actual data from one or more sources, synthetically generated data, and/or other data. Training data utilized to train the model in one or more embodiments of the present invention includes, for instance, data that pertains to one or more events, such as actually obtained event attribute data, and synthetically generated data, etc. The program code in embodiments of the present invention performs a cognitive analysis to generate one or more training data structures, including algorithms utilized by the program code to predict stability of a given event. Machine learning (ML) solves problems that are not solved with numerical means alone. In this ML-based example, program code extracts various attributes from ML training data 510 (e.g., historical event data or other data collected from various data sources relevant to the event), which may be resident in one or more databases 520 containing event or scenario data and general data. Attributes 515 are utilized to develop a predictor function, h(x), also referred to as a hypothesis, which the program code utilizes as a machine learning model 530.

In identifying various event states, features, constraints and/or behaviors indicative of states in the ML training data 510, the program code can utilize various techniques to identify attributes in an embodiment of the present invention. Embodiments of the present invention utilize varying techniques to select attributes (elements, patterns, features, constraints, etc.), including but not limited to, diffusion mapping, principal component analysis, recursive feature elimination (a brute force approach to selecting attributes), and/or a Random Forest, to select the attributes related to various events. The program code may utilize a machine learning algorithm 540 to train the machine learning model 530 (e.g., the algorithms utilized by the program code), including providing weights for the conclusions, so that the program code can train the predictor functions that comprise the machine learning model 530. The conclusions may be evaluated by a quality metric 550. By selecting a diverse set of ML training data 510, the program code trains the machine learning model 530 to identify and weight various attributes (e.g., features, patterns, constraints) that correlate to various states of an event.

The model generated by the program code can be self-learning as the program code updates the model based on active event processing feedback, as well as feedback received from data related to the event. For example, when the program code determines that the synthetically generated data is not statistically accurate, the program code can utilize a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent to tune the model, based on data obtained from one or more data sources. One or more embodiments utilize, for instance, an IBM Watson® system as the cognitive agent. In one or more embodiments, the program code interfaces with IBM Watson Application Programming Interfaces (APIs) to perform a cognitive analysis of obtained data. Specifically, in one or more embodiments, certain of the APIs of the IBM Watson API comprise a cognitive agent (e.g., learning agent) that includes one or more programs, including, but not limited to, natural language classifiers, Retrieve and Rank (i.e., a service available through the IBM Watson Developer Cloud™ that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank APIs, and trade off analytics APIs. The IBM Watson Application Program Interface (API) can also provide audio related API services, in the event that the collected data includes audio, which can be utilized by the program code, including but not limited to natural language processing, text to speech capabilities, and/or translation. IBM Watson® and IBM Watson Developer Cloud™ are registered trademarks or trademarks of International Business Machines Corporation in at least one jurisdiction.

In one or more embodiments, the program code utilizes a neural network to analyze event-related data to generate the model utilized to predict the state of a given event at a given time. Neural networks are a programming paradigm which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

As noted, a lightweight, partial synchronization mechanism or system is provided herein for two or more event coordination systems that facilitates synchronization of events that are determined or predicted to be stable. The characterization of stability of an event of an event coordination system is determined, in one or more implementations, from a likelihood that the event will proceed as planned. In one or more embodiments, multivariate related attributes of the event are considered in determining whether to characterize the event as stable, or unlikely to change. In one or more implementations, the determined event stability for the event is compared to a stability threshold, which with multivariate data, can involve comparing a stability score for each related attribute of the event to a respective stability threshold. In one implementation, a radar chart-type analysis of related attributes is used to determine whether an event is stable. One embodiment of this is depicted in FIG. 6, by way of example.

Figure 6:
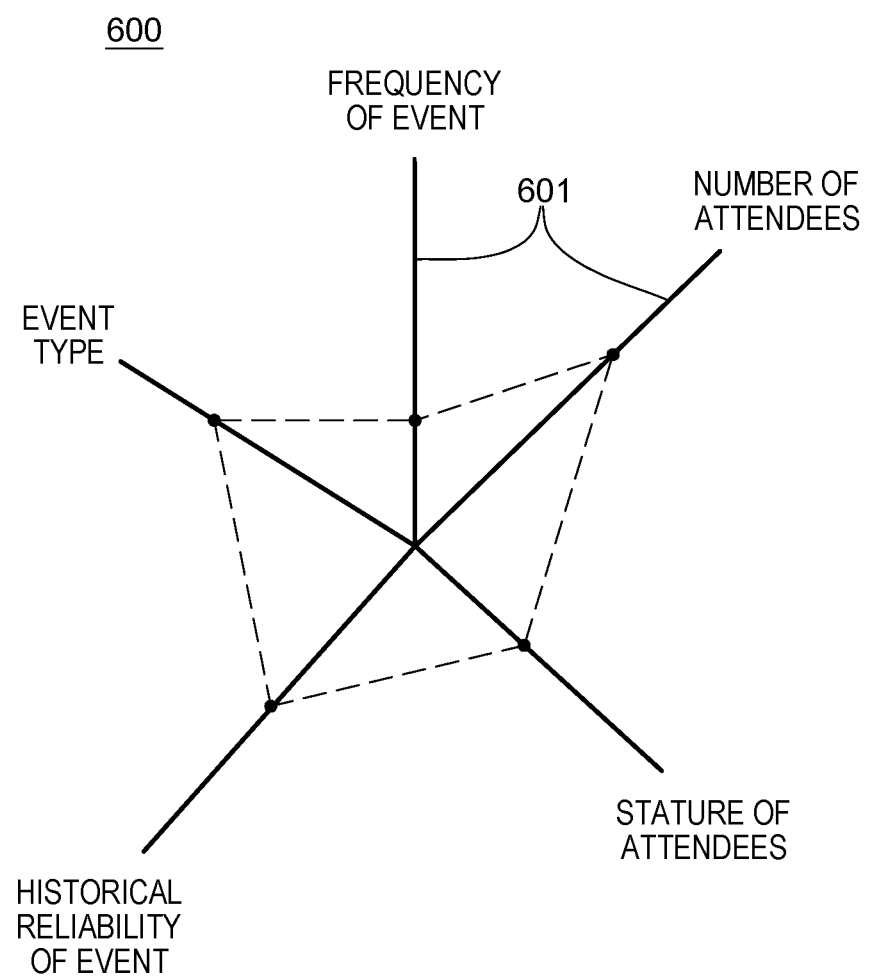
FIG. 6 depicts one example of a radar chart which can be used to determine event stability of an event of an event coordination system, in accordance with one or more aspects of the present invention.

In the example of FIG. 6, a radar chart 600 is illustrated to facilitate analysis of multiple multivariate related attributes 601 of an event. The related attributes can include a variety of event attributes, with event type, frequency of the event, number of invitees or attendees to the event, stature of the attendees, and historical reliability of the event, being illustrated by way of example only. By constructing radar charts for events of an event coordination system, it is possible to characterize events in the event coordination system along a scale from likely-to-change to less-likely-to-change, based on evaluation of the related attributes.

Figure 7:
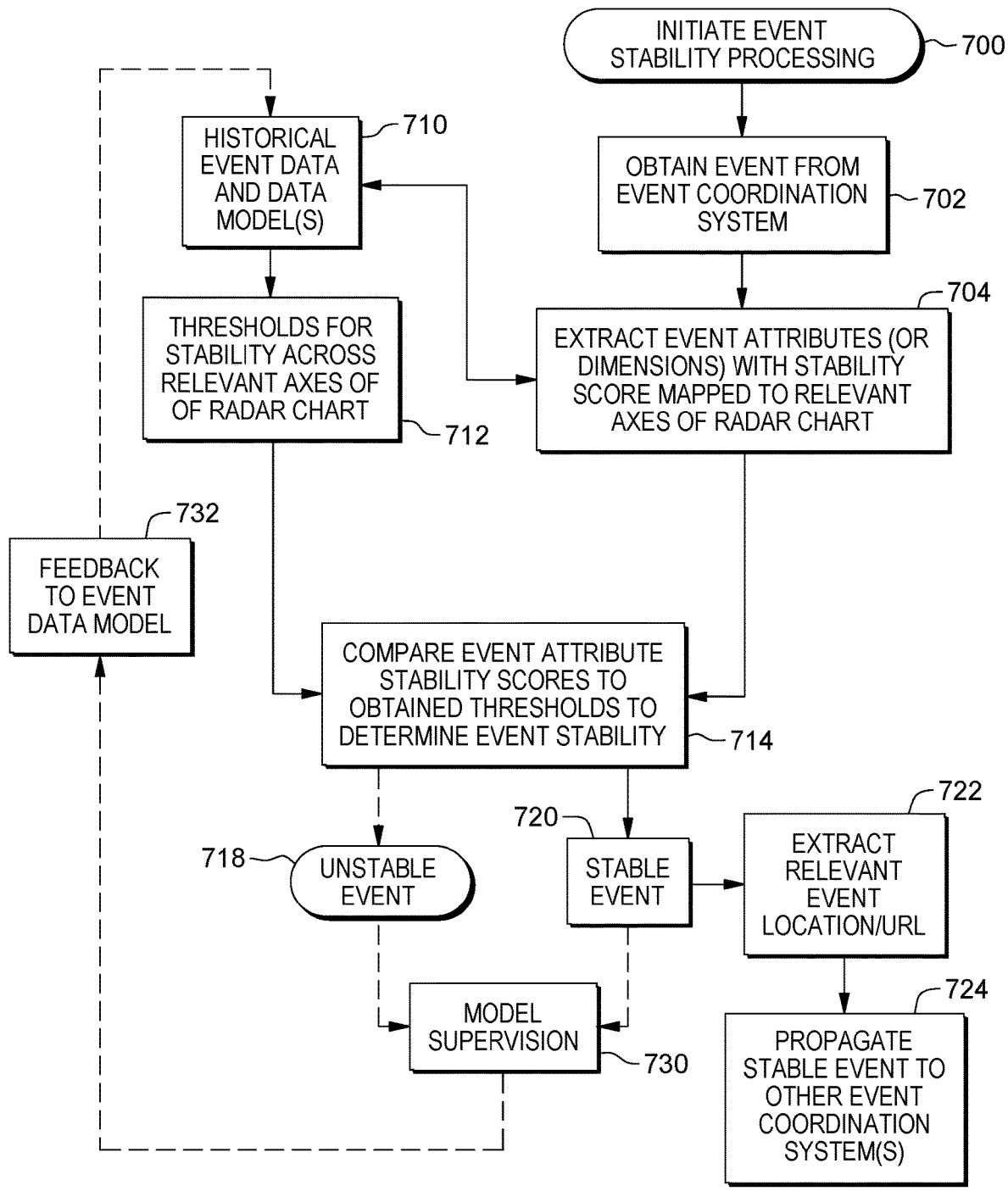
FIG. 7 depicts another example of an event stability processing workflow to facilitate loose coupling of event coordination systems, in accordance with one or more aspects of the present invention.

FIG. 7 depicts another example of an event stability processing workflow which facilitates loose coupling of event coordination systems, in accordance with one or more aspects of the present invention. In this embodiment, multivariate determinations are made around a sliding scale of related attributes representative of event stability including, for instance, importance of the event, an attendee list, criticality of the event, historical reliability of the event, frequency of the event, number of attendees, etc. Radar chart analysis of these attributes and sufficiently similar radar charts of prior events can be used to inform classification of inputs to the forecast model. Pluggable model-dependent calculations can be carried out to provide a forecast of stability of a candidate event. The forecast can be scored against one or more stability thresholds for progressing of a candidate activity to an appropriate and/or requested action, such as propagating a stable event from one event coordination system to another event coordination system.

As illustrated, event stability processing is initiated 700 with obtaining an event to be processed from an event coordination system 702. One or more event attributes or dimensions of the event are extracted, and each is assigned a respective stability score mapped to the relevant axis of a radar chart 704. The extracting of related attributes and assigning of stability scores to each attribute can be performed, in one embodiment, by a machine learning model, with reference to historical event data 710. In one or more implementations, a machine learning model can also be used to establish thresholds for stability across the relevant axis of the radar chart 712 based, for instance, on the historical event data 710 and prior determinations of event stability. Processing compares the event attribute stability scores to the obtained thresholds to determine whether the event is stable 714. For instance, in one or more implementations, an event can be deemed stable if one or more of the related attributes has a stability score exceeding the corresponding stability threshold for the relevant axis of the radar chart. In one or more other implementations, multiple related attributes may need to exceed their corresponding stability thresholds in order to deem an event stable. Irrespective of whether the event is deemed unstable 718 or stable 720, model supervision 730 can be facilitated by providing results of the event comparison and decision as feedback 732 to the event data model(s), such as one or more machine learning models. Also, in one or more embodiments, based on the event being deemed stable 720, a relevant event location and/or URL can be extracted 722, for instance, from the event invite or the event coordination system, and propagated to one or more other event coordination systems 724.

Those skilled in the art will note from the description provided herein that machine-learning-based determination of event stability is used for loose coupling of multiple event coordination systems, and in particular, to facilitate propagation of an event from one system to another system, and/or for a synchronization of select events of the systems. The method can include defining axes of consideration from a plurality of related event attributes, such as criticality of the event, distribution list size, differential social or enterprise ranking between attendees, recurrence pattern, implications to physical plant, etc. A radar chart comparison with prior events can be used to classify candidate attribute inputs to the model. In one or more embodiments, historically stable events can be used to determine future stable events, while retaining an ability to provide feedback on unique events. In one implementation, a prior history of event changes can be harvested, including cancelations of event instances within a series. Events with many cancelations can be treated differently, less impactful, from whole-series changes. Likelihood of cancelation can be characterized by day-of-week frequency, time-of-day frequency, etc. (e.g., typically canceled on a Friday before a Holiday weekend).

In one or more embodiments, stable events of interest from any incoming platform for an event invite can be scanned to produce a clickable meeting URL of the appropriate type. In case of overlapping or double or triple-booked events, the system can choose a most important and stable event to process and/or propagate, resulting in significant savings of time. Further, in one embodiment, the output of the forecast model can be compared against the threshold of desired stability level to inform an appropriate next action from a plurality of actions, such as allowing an end user to provide feedback and supervision to the model. A personalized knowledge corpus of past, present and future events can be maintained based on the events' confirmed, or to-be-confirmed, ranking of importance based on the forecasted stability. This corpus can include, but not be limited to, the ability to confirm stability importance with the user for any weighting factor input for past, present or future events. If the system does not know or understand a forecasted stability indicator, the event stability can be requested from the user to ensure the proper event relevance is confirmed.

Advantageously, the methods and systems disclosed herein facilitate characterizing events by their inherent stability, or likelihood to change, which has implications in all manners of time management systems. Synchronization of work and life calendars of a family unit is one example, where a particularly important personal activity (e.g., a medical diagnosis appointment, wedding attendance, etc.) should be reflected in a work calendar. Arrangements of calendars of high-ranking persons among themselves is another situation, where characterizing of events by associated attributes is advantageous and valuable. In another example, the processing disclosed can be used as an input signal for making derivative decisions or initiating derivative actions, such as, for instance, whether to purchase or cancel a ticket, etc., which may come in the form of prepayment discounts, reduced fees for non-refundable services, etc. Further uses of the machine-learning-based determination of event stability described herein can be initiation-derivative actions in a supply chain environment, where stable events can be used to affect downstream processes, for instance, just-in-time (JIT) inventory management, such as on-time delivery forecasts.

In another implementation, within a shared set of events, there is an opportunity for the system to manage shared overlaps of shared coverage of events between multiple participants. For instance, where multiple events occur simultaneously, and a primary user is a required agenda participant within several meetings, the attendees would need to provide an adequate backup or person with proxy capabilities to attend on their behalf at one or more of the events. This problem can often be encountered, and encourage of flurry of messaging prior to the set of events between possible participants. The machine-learning-based determination of event stability disclosed herein can be utilized across a team, department, organization, etc., to allow multiple participants to arrange for coverage in a seamless manner via their respective event coordination systems. For instance, when double or triple-booking occurs, the machine-learning-based determination of event stability and propagation of stable events disclosed herein can seamlessly be used to determine an attendance factoring approach to ensure shared participants provide potentially adequate coverage. This would allow for multiple events of similar importance to be properly scored and weighted (higher or lower), based on a possible proxy providing adequate backup availability of a next-best attendee to an event. Ultimately, the forecasted stability of the event, and the ability of the shared participants to provide coverage, will determine the shared approach for the team, group of individuals, or larger set of people working to cover multiple events, across a complex plethora of event conflicts.

Other aspects, variations and/or embodiments are possible.

The computing environments described herein are only examples of computing environments that can be used. Other environments may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to provide one or more processes to generate synthetic data that is statistically real, detect whether the synthetic data is acceptable, answer queries based on the synthetic data, oscillate between an initialization state and steady state to improve a training set used to generate the synthetic data, reduce data transmission and data storage and/or to perform to one or more other aspects of the present invention.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of neural networks may be considered. Further, other scenarios may be contemplated. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features.

Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of loosely coupling event coordination systems, the computer-implemented method comprising:
    training a machine learning model to determine stability of events of an event coordination system using a plurality of attributes of the events, the event coordination system including an electronic calendar system;
    using the machine learning model to determine an event stability for an event of the event coordination system;
    comparing the determined event stability for the event to a stability threshold, and determining that the event is a stable event based on the event stability exceeding the stability threshold;
    propagating the stable event from the event coordination system to another event coordination system based on determining that the event is the stable event, wherein the other event coordination system includes another electronic calendar system; and
    wherein propagating the stable event further comprises providing a clickable URL link for the event with propagating of the event from the event coordination system to the other event coordination system.

2. The computer-implemented method of claim 1, further comprising initiating a derivative action, based on determining that the event is the stable event, the derivative action being in addition to propagating the stable event from the event coordination system to the other event coordination system.

3. The computer-implemented method of claim 1, wherein using the machine learning model to determine the event stability for the event comprises using the machine learning model to determine a likelihood that the event will occur as indicated in the event coordination system.

4. The computer-implemented method of claim 3, wherein using the machine learning model to determine the event stability includes comparing the event to historically stable events.

5. The computer-implemented method of claim 3, wherein using the machine learning model to determine the event stability includes using related attributes of the event, of the plurality of attributes of the events, in determining the event stability.

6. The computer-implemented method of claim 5, wherein the related attributes include, at least in part, event type, frequency of the event, number of invitees to the event, and historical reliability of the event.

7. The computer-implemented method of claim 5, wherein using the machine learning model to determine the event stability includes extracting a stability score for each attribute of the related attributes of the event and mapping the stability scores to a radar chart of the related attributes.

8. The computer-implemented method of claim 7, wherein comparing the determined event stability to the stability threshold comprises comparing the stability score for each attribute of the related attributes of the event to a corresponding stability threshold for that attribute and determining that the event is the stable event based on the stability score of a related attribute of the event exceeding the corresponding stability threshold for that event.

9. A computer system for loosely coupling event coordination systems, the computer system comprising:
    a memory; and
    at least one processor in communication with the memory, wherein the computer system is configured to perform a method, the method comprising:
        training a machine learning model to determine stability of events of an event coordination system using a plurality of attributes of the events, the event coordination system including an electronic calendar system;
        using the machine learning model to determine an event stability for an event of the event coordination system;
        comparing the determined event stability for the event to a stability threshold, and determining that the event is a stable event based on the event stability exceeding the stability threshold;
        propagating the stable event from the event coordination system to another event coordination system based on determining that the event is the stable event, wherein the other event coordination system includes another electronic calendar system; and
        wherein propagating the stable event further comprises providing a clickable URL link for the event with propagating of the event from the event coordination system to the other event coordination system.

10. The computer system of claim 9, further comprising initiating a derivative action, based on determining that the event is the stable event, the derivative action being in addition to propagating the stable event from the event coordination system to the other event coordination system.

11. The computer system of claim 9, wherein using the machine learning model to determine the event stability for the event comprises using the machine learning model to determine a likelihood that the event will occur as indicated in the event coordination system.

12. The computer system of claim 11, wherein using the machine learning model to determine the event stability includes using related attributes of the event, of the plurality of attributes of the events, in determining the event stability.

13. The computer system of claim 12, wherein the related attributes include, at least in part, event type, frequency of the event, number of invitees to the event, and historical reliability of the event.

14. The computer system of claim 12, wherein:
    using the machine learning model to determine the event stability includes extracting a stability score for each attribute of the related attributes of the event and mapping the stability scores to a radar chart of the related attributes; and
    comparing the determined event stability to the stability threshold comprises comparing the stability score for each attribute of the related attributes of the event to a corresponding stability threshold for that attribute and determining that the event is the stable event based on the stability score of a related attribute of the event exceeding the corresponding stability threshold for that event.

15. A computer program product for loosely coupling event coordination systems, the computer program product comprising:
   one or more computer-readable storage media and program instructions collectively stored on the one or more computer-readable storage media to perform a method comprising:
      training a machine learning model to determine stability of events of an event coordination system using a plurality of attributes of the events, the event coordination system including an electronic calendar system;
      using the machine learning model to determine an event stability for an event of the event coordination system;
      comparing the determined event stability for the event to a stability threshold, and determining that the event is a stable event based on the event stability exceeding the stability threshold;
      propagating the stable event from the event coordination system to another event coordination system based on determining that the event is the stable event, wherein the other event coordination system includes another electronic calendar system; and
      wherein propagating the stable event further comprises providing a clickable URL link for the event with propagating of the event from the event coordination system to the other event coordination system.

16. The computer program product of claim 15, wherein using the machine learning model to determine the event stability for the event comprises using the machine learning model to determine a likelihood that the event will occur as indicated in the event coordination system.

17. The computer program product of claim 16, wherein using the machine learning model to determine the event stability includes using related attributes of the event, of the plurality of attributes of the events, in determining the event stability.

18. The computer program product of claim 17, wherein:
   using the machine learning model to determine the event stability includes extracting a stability score for each attribute of the related attributes of the event and mapping the stability scores to a radar chart of the related attributes; and
   comparing the determined event stability to the stability threshold comprises comparing the stability score for each attribute of the related attributes of the event to a corresponding stability threshold for that attribute and determining that the event is the stable event based on the stability score of a related attribute of the event exceeding the corresponding stability threshold for that event.

19. A computer-implemented method of loosely coupling event coordination systems, the computer-implemented method comprising:
   training a machine learning model to determine stability of events of an event coordination system using a plurality of attributes of the events, the event coordination system including an electronic calendar system;
   using the machine learning model to determine an event stability for an event of the event coordination system;
   comparing the determined event stability for the event to a stability threshold, and determining that the event is a stable event based on the event stability exceeding the stability threshold;
   propagating the stable event from the event coordination system to another event coordination system based on determining that the event is the stable event, wherein the other event coordination system includes another electronic calendar system; and
   initiating a derivative action, based on determining that the event is the stable event, the derivative action being in addition to propagating the stable event from the event coordination system to the other event coordination system.

* * * * *